April 6, 1943.   F. P. CORBETT   2,315,598
TURBINE BLADE CONSTRUCTION
Filed Feb. 14, 1942
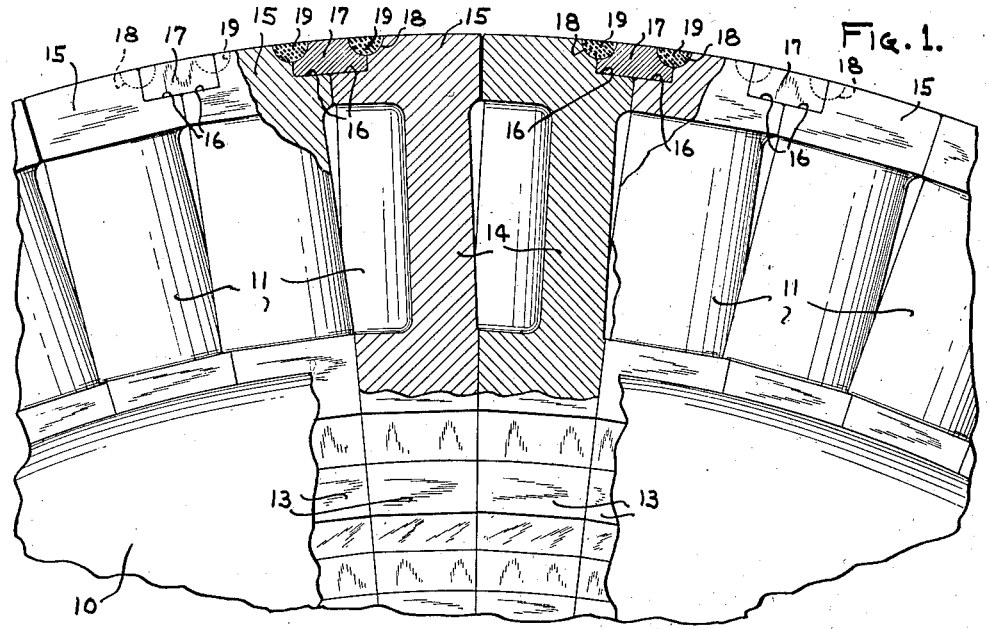
Fig. 1.
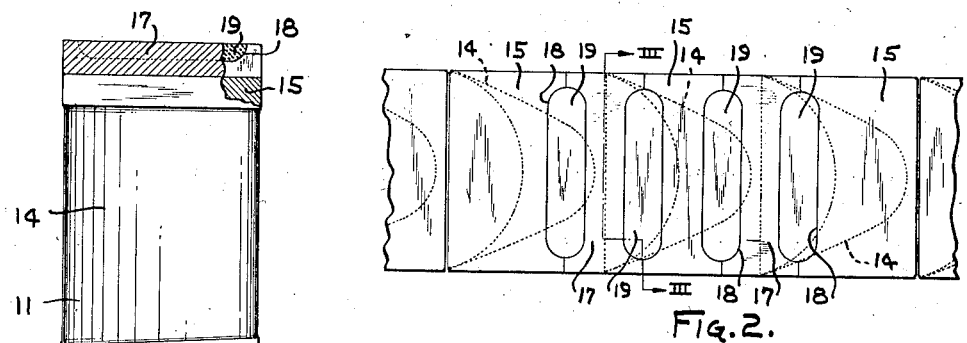
Fig. 2.
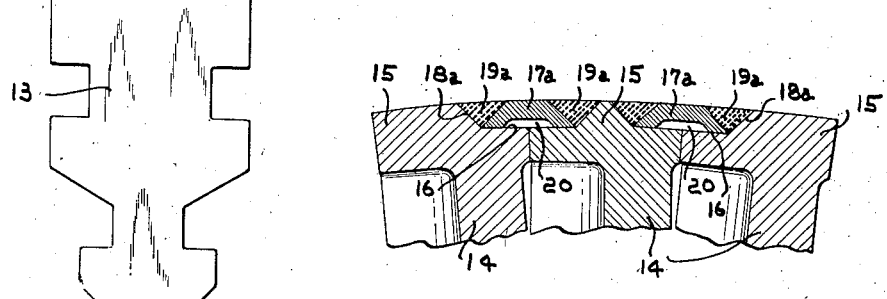
Fig. 3.   Fig. 4.
WITNESSES:
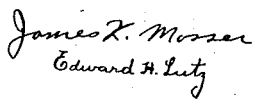
INVENTOR
FRANCIS P. CORBETT.
BY
ATTORNEY Patented Apr. 6, 1943

2,315,598

UNITED STATES PATENT OFFICE 2,315,598

TURBINE BLADE CONSTRUCTION

Francis P. Corbett, Drexel Hill, Pa., assignor to Westinghouse Electric & Manufacturing Company, East Pittsburgh, Pa., a corporation of Pennsylvania Application February 14, 1942, Serial No. 430,853

3 Claims. (Cl. 253—77)

The invention relates to a row of blades for an elastic fluid turbine wherein each blade has an integral shroud element and the shroud elements of the row are arranged circumferentially in end-to-end relation and it has for its object to connect the blades in groups by means of strips arranged in channels formed in contiguous ends of the shroud elements of each group and welded to the shroud elements.

This and other objects are effected by the invention as will be apparent from the following description and claims taken in connection with the accompanying drawing, forming a part of this application, in which:

Fig. 1 is a fragmentary view of a blade row shown partly in elevation and partly in section;

Fig. 2 is a fragmentary plan view looking down on the top surface of the shroud construction;

Fig. 3 is a sectional view taken along the line III—III of Fig. 2; and,

Fig. 4 is a detail and fragmentary sectional view showing a modified form of shroud construction.

In the drawing, there is shown a turbine rotor 10 carrying a row of blades 11.

Each blade 11 comprises a root element 13, a blade element 14, and a shroud element 15. With the blades assembled in a row, the root and shroud elements 13 and 15 thereof are arranged in contiguous relation so as to form inner and outer boundaries for the blade passages.

The invention resides in the novel means provided for connecting the blades in arcuate groups; and, while any suitable number of blades may be connected to form a group, as shown, each group is preferably comprised by three connected blades.

The contiguous ends of the shroud elements 15 of each group are provided with complementary lap joint recesses 16 forming outwardly-opening channels for the metallic strips 17 bridging or overlapping the contiguous ends of the shroud elements of each group.

At the contiguous sides of each channel and its strip 17, there are grooves 18 formed partly in the strip and partly in the shroud elements and weld material 19 fills each groove and joins the strips and the shroud elements.

As shown in Fig. 2, the grooves 18 and the welds 19 terminate short of the sides of the shroud construction.

In Fig. 4, there is shown a modified construction wherein the sides of the strips 17a and of the channel diverge outwardly to provide V-shaped grooves 18a for the weld material 19a.

Also, the strips 17a are formed with inner recesses 20 which bridge the contiguous ends of the connected shroud elements. With this arrangement, manufacture and assembly are facilitated in that the recesses 20 provide for bottoming of the strips 17a in the channels even though the contiguous ends of the shroud elements may not be in alignment. Furthermore, as the strips do not contact with the contiguous corners of the shroud elements, stress concentration in the strips on account of centrifugal or vibratory effects of the blades is avoided.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a turbine, a row of blades; shroud elements integral with the respective blades and arranged circumferentially in end-to-end relation to form a shroud construction for the blade passages; and means for connecting the blades of the row in groups comprising transverse channels open to the outer surface of the shroud construction, each transverse channel being formed by complementary lap joint recesses provided in contiguous ends of shroud elements of each group, metallic strips in the channels, and welded connections between the strip and channel sides.

2. In a turbine, a row of blades; shroud elements integral with the respective blades and arranged circumferentially in end-to-end relation to form a shroud construction for the blade passages; and means for connecting the blades in groups comprising transverse channels open to the outer surface of the shroud construction, each transverse channel being formed by complementary lap joint recesses provided in contiguous ends of shroud elements of each group, metallic strips in the channels, said shroud elements and strips being formed to provide outwardly-opening grooves at the side of the channel and of the strips, and weld material filling the grooves to join the strips and the shroud elements.

3. The combination as claimed in claim 1 wherein each strip is provided with a clearance space at the bottom of its channel and bridging the contiguous ends of the shroud elements.

FRANCIS P. CORBETT.